3,259,644
PREPARATION OF TRIISOBUTYLALUMINUM
John C. Snyder, Darling, Pa., assignor to Hercules Powder Company, Wilmington, Del., a corporation of Delaware
Filed May 9, 1960, Ser. No. 27,597
3 Claims. (Cl. 260—448)

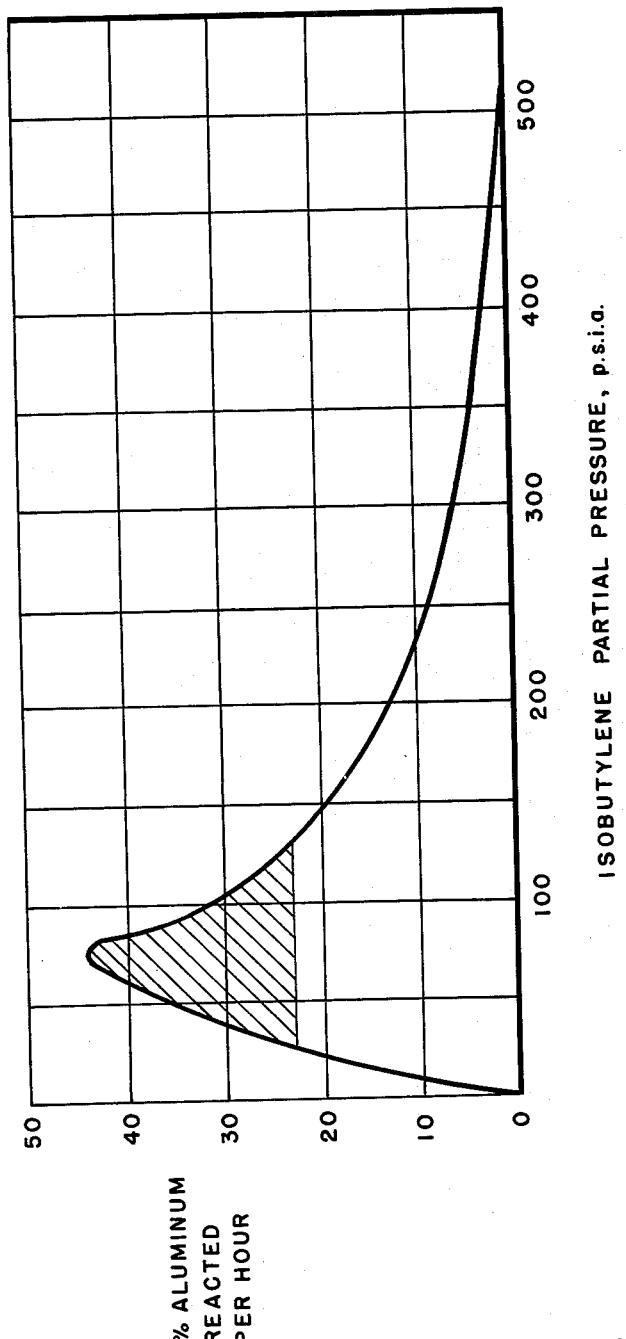

The present invention relates to a process for the manufacture of triisobutylaluminum and diisobutylaluminum hydride by the reaction of aluminum, isobutylene and hydrogen.

It is known that triisobutylaluminum can be prepared by the reaction of activated aluminum with hydrogen and isobutylene at elevated temperature and pressure. The mechanism of this synthesis is quite obscure although the over-all reaction can be represented by the equation:

$$Al + \tfrac{3}{2}H_2 + 3i\text{-}C_4H_8 \rightarrow Al(i\text{-}C_4H_9)_3$$

The usual procedure for carrying out the reaction has been to charge activated aluminum, customarily as a slurry in previously prepared product when available, sufficient isobutylene for the conversion of a substantial amount of the aluminum, and finally sufficient hydrogen pressure, incrementally to maintain an acceptable reaction rate. In the past, it has been thought necessary to carry out the reaction at a relatively high pressure, a pressure of about 1500 p.s.i.g. being most commonly recommended.

In accordance with the present invention it has been found that the rate of reaction is influenced markedly by the relative concentration of isobutylene and hydrogen in the gas phase above the reaction. More specifically, it has been found that if the concentration of isobutylene in the gas phase is maintained within a certain range, an optimum rate of reaction is obtained which has the attendant advantage of permitting a lower reaction pressure. The advantage of a lower operating pressure in turn provides the practical advantage of simplifying the operation of the process; e.g., heat control problems are minimized and the feeding of reactants to the reactor under pressure is facilitated.

As a practical adaptation of the above discovery, the process of the invention comprises reacting aluminum with hydrogen and isobutylene at an elevated temperature and superatmospheric pressure, while maintaining in the vapor phase above the reaction an isobutylene content corresponding to that obtained by first pressuring the reaction vessel with isobutylene to a pressure equal to from about 6 to 26% of the reaction pressure and then pressuring with hydrogen to the reaction pressure.

The manner in which the isobutylene content of the gas phase is above defined is occasioned by the fact that the two gases are not perfect gases. Consequently, a different isobutylene content would be achieved by first pressuring with hydrogen to from 94 to 74% of the reaction pressure and then pressuring with isobutylene. This does not mean, however, that the reverse order of addition cannot be employed, but simply that when it is employed, the degree of pressuring with each gas will be slightly different in order to achieve the same isobutylene concentration.

As is typical of many reactions involving metallic aluminum, the aluminum utilized in the present process should be activated, i.e., it should have at least a portion of its surface in metallic form substantially free from oxide coating. This can be accomplished by subdividing aluminum in an inert atmosphere, by spraying molten aluminum into an inert atmosphere, or by milling aluminum in a suitable liquid, all of which are techniques well known in the art. For purposes of this invention, it is particularly convenient to activate the aluminum by ball-milling it in the reaction product, i.e., triisobutylaluminum. In this way there is prepared a slurry of aluminum in triisobutylaluminum which can be charged as such to the reactor. Another way of activating the aluminum to be used in the process is by activation in situ, e.g., by conducting the reaction under conditions such that the aluminum is milled during the reaction.

Before proceeding to illustrate the invention in greater detail, reference is made to the attached drawing which is a graph showing the effect of variations in the partial pressure of isobutylene upon the reaction rate under controlled conditions of 515 p.s.i.a. total pressure and 140° C.

The invention will be illustrated by detailed examples in which parts and percentages are by weight unless otherwise specified.

General procedure of examples

The reactor and the general procedure employed in all examples were the same. The reactor was a 500 milliliter stainless steel, high pressure autoclave equipped with an agitator, electrical heating jacket and inlet lines for liquid isobutylene and gaseous hydrogen. Auxiliary apparatus included a storage vessel for aluminum slurry, a hydrogen reservoir and storage and pump facilities for liquid isobutylene.

The procedure for activating the aluminum comprised ball-milling a 20% slurry of aluminum in triisobutylaluminum (an equilibrium mixture of 95% triisobutylaluminum and 5% diisobutylaluminum hydride) for a period of 8 hours. Before use in the reaction this slurry was diluted to the concentrations hereafter indicated by addition of more triisobutylaluminum.

During the run isobutylene partial pressure was maintained essentially constant by initially adjusting the isobutylene pressure to a predetermined value prior to pressuring with hydrogen, and then adding hydrogen and isobutylene in the proportion these two reactants are consumed in the process, i.e., approximately 2 moles isobutylene per mole of hydrogen. The specific details follow.

Before beginning the reaction, the reactor was pressure tested at 1515 p.s.i.a. It was then evacuated and flushed two or three times with nitrogen followed by re-evacuation. Following addition of a predetermined amount of aluminum slurry the agitator was started and the reactor again evacuated to remove dissolved nitrogen from the slurry. The reactor was then heated to 140° C. and the pressure at that temperature (caused by liberation of isobutylene from triisobutylaluminum) was measured. The isobutylene pressure was then adjusted to a predetermined value either by venting the reactor or by pumping in additional isobutylene. The reactor pressure was next raised to 515 p.s.i.a. with hydrogen and this was noted as zero time.

During the course of reaction whenever the reactor pressure fell to 465 p.s.i.a., hydrogen was added from the reservoir to bring the reactor pressure back to 515 p.s.i.a. From the pressure drop in the hydrogen reservoir the amount of isobutylene necessary to give the desired ratio of 2 moles isobutylene added per mole of hydrogen added was calculated and the calculated amount of isobutylene was added  This required periodic additions of hydrogen and isobutylene throughout the course of the reaction.

Finally, when the reaction ceased to take up hydrogen, the reactor was vented slowly to atmospheric pressure while still hot, with the evolved gases being condensed in a Dry Ice trap.

The reaction mixture was then allowed to cool to room temperature and transferred into a glass receiver under a nitrogen atmosphere. The total product was weighed and analyzed for percent solid aluminum. A portion of the liquid phase of the product was then hydrolyzed and the hydrolysis off-gas was analyzed by mass spectrometry.

From this data, the composition of the liquid phase was determined. In all cases the liquid phase was a mixture of triisobutylaluminum and diisobutylaluminum hydride in which the mole fraction of the latter averaged about 0.26.

Next, from the amount of aluminum consumed during the whole reaction and the slope of the curve plotting p.s.i. hydrogen consumed versus time, the reaction rate to 50% conversion of aluminum in terms of percentage of aluminum charged which was consumed per hour was calculated.

The data for each example follow:

TABLE

| Example number | Slurry charged, parts | Wt. percent aluminum in slurry | Isobutylene pressure, p.s.i.a. | Conversion of Al (percent) | 50% conversion time (min.) | Percent Al reacted per hour |
|---|---|---|---|---|---|---|
| 1 | 138 | 11.8 | 29 | 81 | 125 | 24 |
| 2 | 134.6 | 10.5 | 39 | 84 | 99 | 30 |
| 3 | 136.0 | 11.8 | 45 | 77 | 90 | 33 |
| 4 | 136.7 | 10.5 | 65 | 82 | 71 | 42 |
| 5 | 138.5 | 11.8 | 65 | 76 | 71 | 42 |
| 6 | 136 | 11.8 | 75 | 81 | 68 | 44 |
| 7 | 139.4 | 11.8 | 112 | 39 | ¹106 | 28 |
| 8 | 135 | 17.0 | 128 | 64 | 132 | 23 |
| 9 | 131.5 | 17.0 | 167 | 50 | 178 | 17 |
| 10 | 133.5 | 17.0 | 290 | 20 | ¹444 | 7 |

¹ Extrapolated to 50% from end of run.

As previously mentioned, the attached drawing is a plot of reaction rate versus isobutylene partial pressure for which the data were taken from the above table. As seen from the drawing, the reaction rate varies markedly with the partial pressure of isobutylene and is optimum when the partial pressure of isobutylene is maintained within the range of 30 to 130 p.s.i.a. which is between about 6 and 26% of the total absolute pressure, as provided for in the practice of the invention.

As seen from the examples, the invention is an improvement in the preparation of triisobutylaluminum by the reaction of aluminum with hydrogen and isobutylene at elevated temperature and pressure, which improvement comprises maintaining in the gas phase above the reaction an isobutylene content corresponding to that obtained by first pressuring with isobutylene to from about 6 to 26% of the total reaction (isobutylene plus hydrogen) pressure and then pressuring to the reaction pressure with hydrogen.

The improvement of the invention is obtainable throughout the full range of temperatures and pressures by which the same reaction is carried out according to the prior art.

The temperature for the reaction is the same as recommended in the art with a temperature of 120° to 160° C. being preferred.

However, one of the incidental advantages of the invention is that it permits the use of a lower pressure than is normally advocated by the art and thus for practical purposes a total reaction pressure of about 200 to 800 p.s.i.a. is preferred. Of course, the concentration of isobutylene is kept within the range previously recited regardless of any variation in total pressure.

In carrying out the process of the invention there are various methods for maintaining the concentration of isobutylene within the desired range. In the examples this was accomplished by pressuring with isobutylene to the desired partial pressure prior to addition of hydrogen and then introducing hydrogen and isobutylene during the reaction in the proportion in which these two reactants are consumed in the reaction. There are various other ways of achieving the same result, all of which are within the skill of the routineer. For instance, a sample of the gas within the reactor can be taken periodically or continuously and analyzed for isobutylene content. From this data the addition or isobutylene and hydrogen can be so controlled as to give the desired concentration of isobutylene.

The improved rate of reaction that is achieved by the invention can be utilized to full extent in a continuous reactor by operating at an intermediate level of conversion with the unconsumed reactants being separated from the product and recycled to the reactor. Also, in a continuous process advantage is obtainable from the fact that the reaction can be carried out at a relatively low pressure, thus facilitating the introduction of reactants and otherwise simplifying the process.

What I claim and desire to protect by Letters Patent is:

1. In the preparation of triisobutylaluminum by the reaction of aluminum with hydrogen and isobutylene at an elevated temperature and superatmospheric pressure, the improvement which comprises first pressuring the reaction with isobutylene and hydrogen in such proportions that the isobutylene contributes from 6 to 26% of the reaction pressure, and then throughout the reaction maintaining in the gas phase above the reaction an isobutylene pressure within said range.

2. The process of claim 1 in which the temperature is from 120° C. to 170° C. and the total pressure from 200 to 800 p.s.i.a.

3. The process of claim 1 in which the aluminum is activated by milling in triisobutylaluminum.

References Cited by the Examiner

UNITED STATES PATENTS 3,013,042  12/1961  Blitzer et al. _____ 260—448
3,030,401  4/1962  Movsovic et al. _____ 260—448

FOREIGN PATENTS 216,001  7/1958  Australia.

OTHER REFERENCES

"Data Book Hydrocarbons," by J. B. Maxwell (Van Nostrand Co., 1950), page 30.

TOBIAS E. LEVOW, *Primary Examiner.*